US006983161B2

(12) United States Patent
Wesby et al.

(10) Patent No.: US 6,983,161 B2
(45) Date of Patent: Jan. 3, 2006

(54) METHOD FOR PERFORMING FREQUENCY SYNCHRONIZATION OF A BASE STATION AND A NETWORK PART

(75) Inventors: Philip B Wesby, Stratford-Upon-Avon (GB); Alexander Esser, Espoo (FI)

(73) Assignee: Nokia Corporation, Espoo (FI)

(*) Notice: Subject to any disclaimer, the term of this patent is extended or adjusted under 35 U.S.C. 154(b) by 642 days.

(21) Appl. No.: 10/091,344

(22) Filed: Mar. 6, 2002

(65) Prior Publication Data

US 2002/0132631 A1 Sep. 19, 2002

Related U.S. Application Data

(63) Continuation of application No. PCT/FI00/00750, filed on Sep. 6, 2000.

(30) Foreign Application Priority Data

Sep. 8, 1999 (FI) .............................................. 19991915

(51) Int. Cl.
*H04B 7/01* (2006.01)

(52) U.S. Cl. ......................... 455/502; 375/354; 370/503
(58) Field of Classification Search ................. 455/501, 455/502, 526, 507; 375/354, 356, 357, 358, 375/362; 370/503, 516, 520
See application file for complete search history.

(56) References Cited

U.S. PATENT DOCUMENTS 4,142,069 A   2/1979  Stover 5,402,424 A * 3/1995 Kou ............................ 370/324
5,958,060 A * 9/1999 Premerlani .................. 713/400
6,230,021 B1 * 5/2001 Ohdachi ..................... 455/502

FOREIGN PATENT DOCUMENTS

| EP | 595 351 | 5/1994 |
|---|---|---|
| EP | 903 873 | 3/1999 |
| EP | 915 587 | 5/1999 |
| JP | 06029914 A | 2/1994 |
| JP | 07280971 A | 10/1995 |
| JP | 10-322259 | 4/1998 |
| JP | 2001-174821 A | 6/2000 |
| WO | WO 00/28401 | 5/2000 |
| WO | WO 00/69102 | 11/2000 |

* cited by examiner

*Primary Examiner*—Vivian Chin
*Assistant Examiner*—Sanh Phu
(74) *Attorney, Agent, or Firm*—Pillsbury Winthrop LLP

(57) ABSTRACT

The invention relates to a method for performing frequency synchronization of a base station, and to a network part. In the method, the following operations are performed: maintaining a reference clock in a network element of the cellular radio network; generating a time stamp signal in the reference clock; transferring the time stamp signal from the network element to the base station over an asynchronous data transmission connection; calculating on the basis of the transferred time stamp signal how much the time by the local clock at the base station deviates from the time by the reference clock; generating a speed correction factor for the local clock on the basis of at least one calculated deviation; correcting the running of the local clock with the speed correction factor; and generating the frequencies needed at the base station by using the local clock corrected with the speed correction factor.

10 Claims, 4 Drawing Sheets

METHOD FOR PERFORMING FREQUENCY SYNCHRONIZATION OF A BASE STATION AND A NETWORK PART

This application is a Continuation of International Application PCT/FI00/00750 filed on the 6th of Sep. 2000 which designated the U.S. and was published under PCT Article 21(2) in English.

FIELD

The invention relates to a method for performing frequency synchronization of a base station in a cellular radio network, and to a network part in a cellular radio network.

BACKGROUND

A base station of a cellular radio network requires an accurate clock signal to guarantee high frequency stability and accurate timing on the air interface. GSM specifications require a relative accuracy of $5 \times 10^{-8}$ on the air interface which might be relaxed to $10^{-7}$ for base stations used in a pico cellular environment. This high accuracy is achieved by conveying a clock signal as a pulse train along the national telephone backbone, along the GSM infrastructure, e.g. Mobile Switching Centre (MSC) or Base Station Controller (BSC) up to the base stations.

The national reference clock has a relative frequency stability of $10^{-11}$ over 24 hours. But the long transmission chain to the base station introduces jitter and wander in the clock signal. The base station relies on an accuracy of $1.5 \times 10^{-8}$ at its 2 MBit/s PCM (Pulse Code Modulation) Abis interface. The transcoder inside the base station has a 16 MHz clock (divided down to 2 MHz) which is phase locked to the PCM clock pulses, jitter and wander above 2 Hz is filtered out, and the signal is averaged over approximately 15 minutes. The 2 MHz clock signal which has been "cleaned" in this way has an improved accuracy and serves as a reference clock for a 26 MHz clock in the Base Station Controller Function (BCF). All frequencies and timing on the radio interface are ultimately derived from this 26 MHz clock.

The described known method of providing the base station with an accurate clock relies on a continuously existing transmission chain from the fixed network to the base station. This becomes a problem if part of this transmission chain runs across a non-clocked network, which is the case for the new indoor cellular radio networks. In these networks there usually is no BSC but the functionality of the BSC is distributed over an IP (Internet Protocol) network, or intranet. IP networks are not clocked since they operate asynchronously, and transmission times are highly variable and unpredictable.

One solution to the problem is to equip a network element with a highly accurate clock and the clock signal is distributed to a base station with a synchronous line, e.g. an ISDN (Integrated Services Digital Network) or HDSL (High Bit Rate Digital Subscriber Line) transmission line.

The goal for the indoor cellular radio networks, however, is to take advantage of the existing network cabling in office environments by connecting base stations directly to an asynchronous network.

Providing additional cables for carrying a clock signal works against the primary reason for using the intranet: making better use of an existing network. With additional cables there is no need to connect base stations to the LAN (Local Area Network) at all. Base stations can then be directly connected to the network via HDSL transmission which is synchronous and which only requires a simple twisted pair cable.

There exists a wide variety of clocks which can be used at base stations. Very expensive clocks require a constant temperature environment (oven maintained) and provide a high accuracy approaching even that of the national reference clock. To increase the cost efficiency of the system, expensive, oven maintained clocks should be avoided as far as possible, especially at base stations.

BRIEF DESCRIPTION

An object of the invention is to provide an equipment that allows the above problems to be solved. This is achieved with an equipment described below, which is a network part in a cellular radio network comprising: a base station, the base station comprising a local clock; a network element connected to the base station via an asynchronous data transmission connection, the network element comprising a reference clock; the reference clock comprising means for generating a time stamp signal and means for sending the time stamp signal over the asynchronous data transmission connection from the network element to the base station; the base station comprising means for receiving the time stamp signal sent over the asynchronous data transmission connection and means for calculating on the basis of the received time stamp signal how much the time by the local clock at the base station deviates from the time by the reference clock. The base station further comprises means for generating a speed correction factor for the local clock on the basis of at least one calculated deviation; means for correcting the running of the local clock with the speed correction factor; and a frequency synthesizer for generating the frequencies needed at the base station by using the local clock corrected with the speed correction factor.

The invention further relates to a method for performing frequency synchronization of a base station in a cellular radio network, the method comprising the steps of maintaining a reference clock in a network element of the cellular radio network; generating a time stamp signal in the reference clock; transferring the time stamp signal from the network element to the base station over an asynchronous data transmission connection; calculating on the basis of the transferred time stamp signal how much the time by the local clock at the base station deviates from the time by the reference clock. The method also comprises the steps of generating a speed correction factor for the local clock on the basis of at least one calculated deviation; correcting the running of the local clock with the speed correction factor; generating the frequencies needed at the base station by using the local clock corrected with the speed correction factor.

The basic idea of the invention is to control the running of the base station clock on the basis of the time data provided by the time stamps.

The method and equipment of the invention provide several advantages. An expensive clock is not needed at the base station, which reduces the costs of manufacture of the base station. In addition, a synchronous data transmission connection is not needed for transmitting time stamp signals, but an asynchronous data transmission connection is sufficient. In the functioning of the method it is not the duration of the transmission delay but the stability of the delay variation that is essential.

BRIEF DESCRIPTION OF THE DRAWINGS

In the following the invention will be described in greater detail in connection with preferred embodiments and with reference to the accompanying drawings in which.

DESCRIPTION OF EMBODIMENTS

Figure 1:
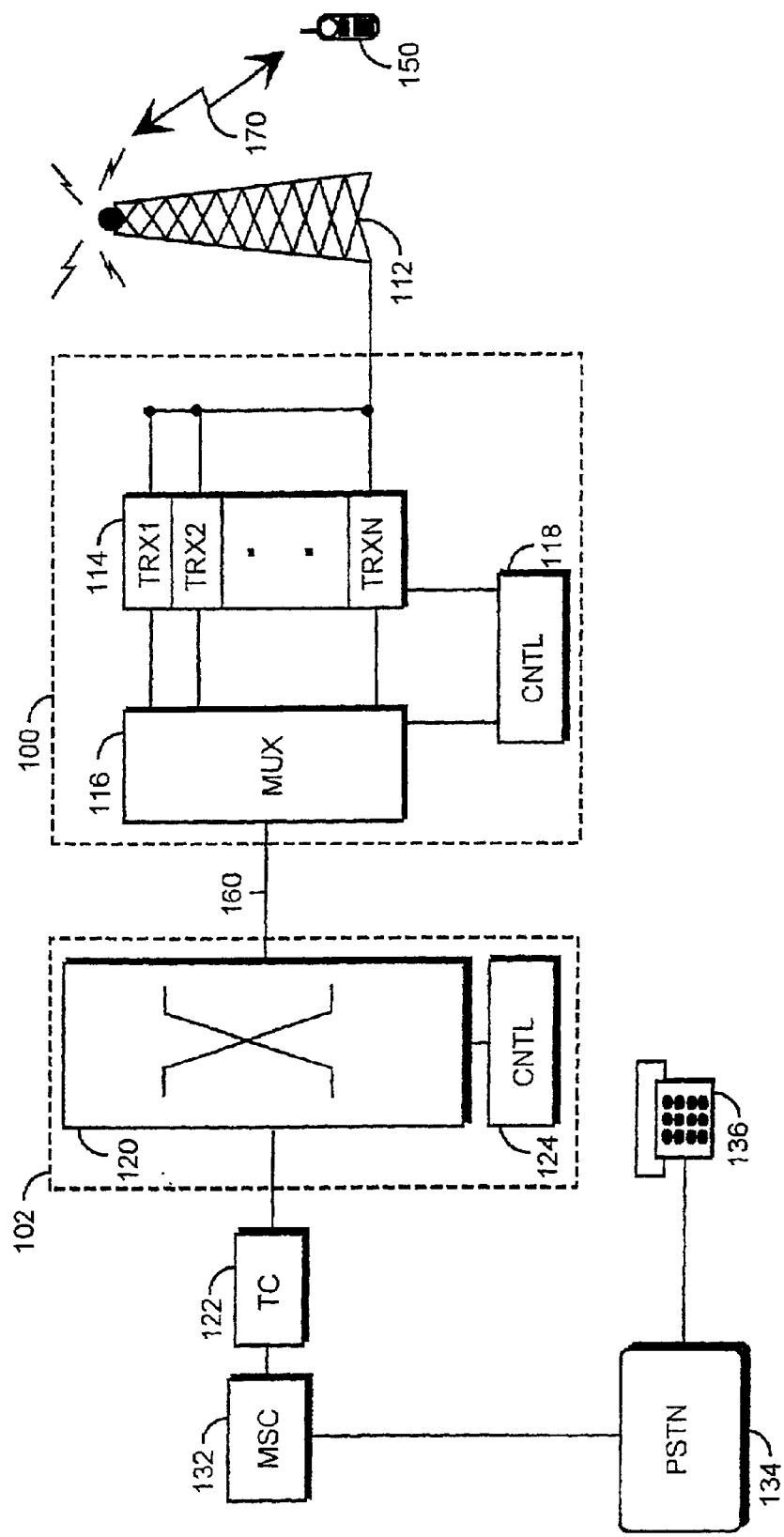
FIG. 1 illustrates an example of a structure of a cellular radio network.

With reference to FIG. 1, a typical structure of a cellular radio network will be described. FIG. 1 only comprises the blocks that are essential for the description of the invention, although it is apparent to a person skilled in the art that a conventional cellular radio network also comprises other functions and structures which need not be discussed in greater detail in this context. The example illustrates a GSM cellular radio network utilizing TDMA (Time Division Multiple Access), without, however, restricting the invention thereto.

A cellular radio network typically comprises a fixed network infrastructure, i.e. a network part, and subscriber terminals 150, such as fixedly mounted, vehicle mounted or portable terminals. A subscriber terminal 150 can be for instance a standard mobile phone which can be connected by means of an additional card to a portable computer, for example, that can be used in packet transmission for ordering and processing of packets.

The network part comprises base stations 100. A plural number of base stations 100 are, in turn, controlled in a centralized manner by a base station controller 102 communicating with them. A base station 100 comprises transceivers 114. A base station 100 typically comprises 1 to 16 transceivers 114. One transceiver 114 offers radio capacity to one TDMA frame, i.e. typically to eight time slots.

The base station 100 comprises a control unit 118 which controls the operation of the transceivers 114 and a multiplexer 116. The multiplexer 116 arranges the traffic and control channels used by a plural number of transceivers 114 to a single transmission connection 160. The transceivers 114 of the base station 100 are connected to an antenna unit 112 which provides a bi-directional radio connection 170 to a subscriber terminal 150. The structure of the frames transmitted in the bi-directional radio connection 170 is determined in detail, and the connection is referred to as an air interface.

Figure 2:
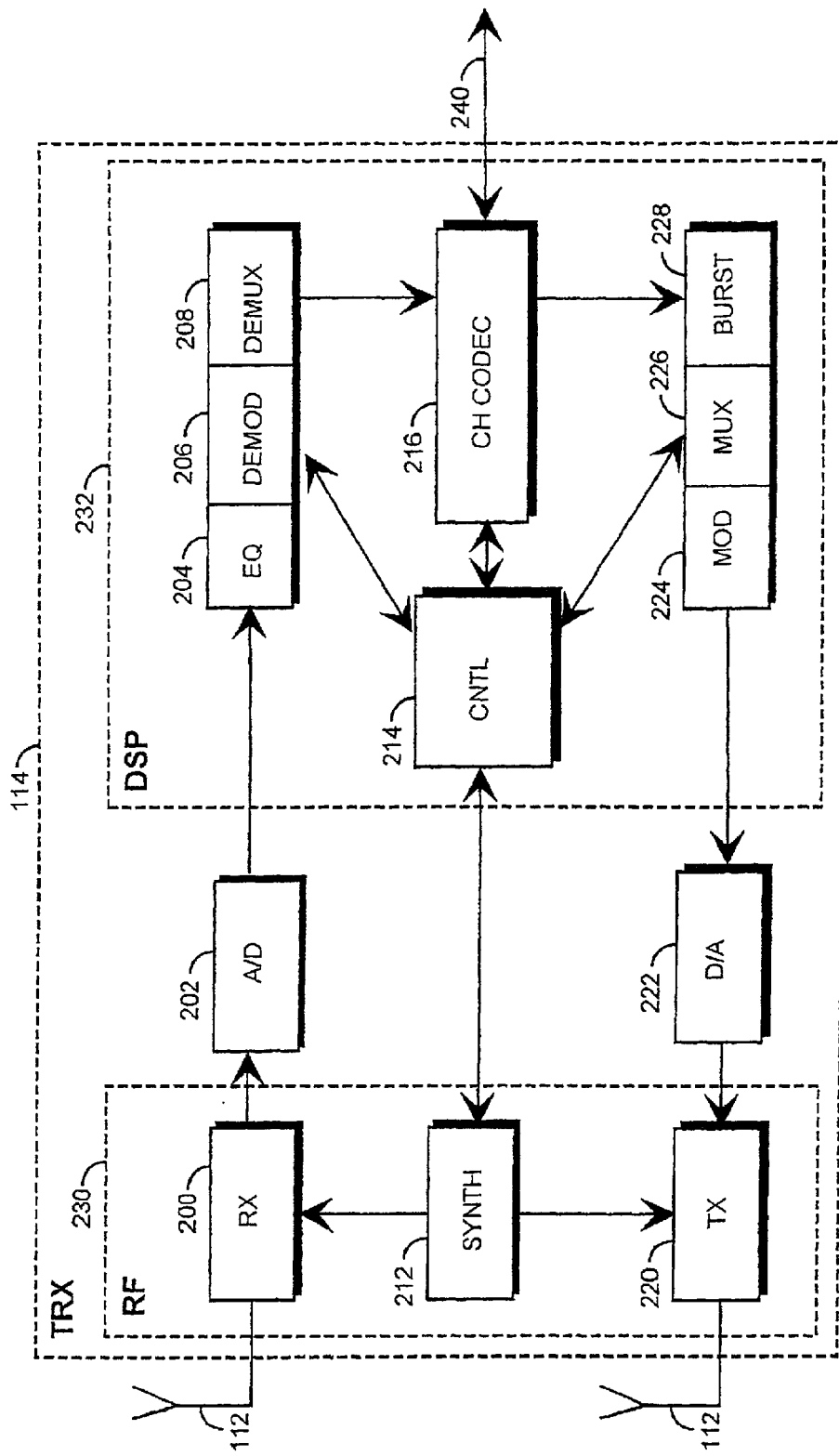
FIG. 2 illustrates a transceiver structure.

FIG. 2 illustrates in greater detail the structure of a transceiver 114. A receiver 200 comprises a filter blocking frequencies outside a desired frequency band. A signal is then converted to an intermediate frequency or directly to baseband, and in this form the signal is sampled and quantized in an analog-to-digital converter 202. An equalizer 204 compensates for interference caused for instance by multi-path propagation. From the equalized signal, a demodulator 206 takes a bit stream, which is transmitted to a demultiplexer 208. The demultiplexer 208 separates the bit stream from different time slots into separate logical channels. A channel codec 216 decodes the bit streams of the separate logical channels, i.e. decides whether a bit stream is signalling data, which is transmitted to a control unit 214, or whether the bit stream is speech, which is transmitted 240 to a speech codec 122 of the base station controller 102. The channel codec 216 also performs error correction. The control unit 214 performs internal control functions by controlling different units. A burst former 228 adds a training sequence and a tail to the data arriving from the speech codec 216. A multiplexer 226 assigns a time slot to each burst. A modulator 224 modulates digital signals to a radio frequency carrier. This is an analog operation, therefore a digital-to-analog converter 222 is needed for performing it. A transmitter 220 comprises a filter restricting the bandwidth. In addition, the transmitter 220 controls the output power of a transmission. A synthesizer 212 arranges the necessary frequencies for the different units. The synthesizer 212 comprises a clock which in the invention is controlled from another network element, for example from the base station controller 102. The synthesizer 212 generates the necessary frequencies by using a voltage controlled oscillator, for example.

As shown in FIG. 2, the structure of the transceiver can be further divided into radio frequency parts 230 and a digital signal processor including software 232. The radio frequency parts 230 comprise the receiver 200, transmitter 220 and synthesizer 212. The digital signal processor including the software 232 comprises an equalizer 204, demodulator 206, demultiplexer 208, channel codec 216, control unit 214, burst former 228, multiplexer 226 and modulator 224. The analog-to-digital converter 202 is needed for converting an analog radio signal to a digital signal and, correspondingly, the digital-to-analog converter 222 is needed for converting a digital signal to an analog signal.

The base station controller 102 comprises a switching field 120 and a control unit 124. The switching field 120 is used for switching speech and data and for connecting signalling circuits. The base station 100 and the base station controller 102 form a Base Station System which additionally comprises a transcoder 122. The transcoder 122 converts different digital speech coding modes used between a public switched telephone network and a radio network, to make them compatible with each other, for instance from the 64 kbit/s fixed network form to another cellular radio network form (such as 13 kbit/s), and vice versa. The transcoder 122 is usually located as close to a mobile switching centre 132 as possible because this allows speech to be transmitted between the transcoder 122 and the base station controller 102 in a cellular radio network form, which saves transmission capacity. The control unit 124 carries out call control, mobility management, collection of statistical data and signalling.

FIG. 1 illustrates how a circuit-switched transmission connection is established between the subscriber terminal 150 and a Public Switched Telephone Network terminal 136. In the Figures, a line illustrates how data travels through the system over the air interface 170, from the antenna 112 to the transceiver 114 and from there multiplexed in the multiplexer 116 over the transmission connection 160 to a switching field 120, where a connection has been established to an output leading to the transcoder 122, and from there further through a connection established at the mobile services switching centre 132 to the terminal 136 connected to the public switched telephone network 134. At the base station 100 the control unit 118 controls the multiplexer 116 performing the transmission, and at the base station controller 102 the control unit 124 controls the switching field 120 to ensure correct switching.

The invention is particularly well suited for use in cellular radio networks located in offices. The base stations 100 can in this case be called office base stations. A major advantage offered by cellular radio networks placed in offices is that they allow the telecommunications network within the building to be used free of charge for providing the transmission connection 160 between the base stations 100 and the base station controller 102. The telecommunications network can be for example an IP network (Internet Protocol) or an ATM network (Asynchronous Transfer Mode). When for example an IP network is used, each network element can have a separate IP address to which the data packets are addressed. The telecommunications network can also be a larger company-internal network, an intranet, connecting the company's geographically separate offices together.

As already stated above, indoor cellular radio networks do not necessarily have a network element called base station controller. Instead, the functionality provided by a base station controller can be dispersed into network elements connected with each other via an asynchronous data transmission connection, whereby the controller is composed of two computers, for example, that together provide the normal base station controller functionality in the telecommunications network and, in addition, the necessary management of the telecommunications traffic.

According to the invention, a network element of the cellular radio network, e.g. the base station controller 102 sends the time stamps, and the base stations directly receive them and each base station generates its own reference frequency.

Another solution is that a LAN node element, e.g. a hub, bridge, router or switch, which is modified for use in a LAN dedicated to the indoor cellular radio network, sends the time stamps, and the base stations directly receive them and each base station generates its own reference frequency. Especially the hub provides the advantage of less collisions occurring in the traffic, and therefore the time stamp sending functions more reliably.

The base station, in turn, can be equipped with a cheaper clock. More expensive clocks might be required in the units sending the time stamps, but in any case fewer of them are needed.

There are different choices as to where the network element sending time stamps in turn can receive an accurate reference from:

It can receive the clock signal generated by the national reference clock which is "visible" in the cellular radio network through its A-interface, i.e. the interface towards the MSC 132. Then, the incoming clock pulses are averaged in a similar way as at a base station of the prior art. Thus, the clock in the time stamp sending unit can achieve an accuracy of at least $1 \times 10^{-8}$.

The national reference clock might also be visible over some other telecom line, such as an E1/T1 connection to an Internet Service Provider.

The time stamp sending unit can have a built-in stand-alone clock, especially if the loss of accuracy over the IP network is larger than anticipated here, or there is no visibility to the national reference clock (e.g. a stand-alone indoor cellular radio network without an A-interface). A clock with an accuracy of $1 \times 10^{-9}$ might be necessary, for example an atomic clock, or a GPS (Global Positioning System) clock, in which case the GPS receiver's antenna might have to be located outside the building.

It might be sufficient to have one stand-alone clock per an indoor cellular radio network system or building, if the time stamp sending units can easily be connected to the stand-alone clock by cable, e.g. if these units are kept together in an equipment room.

Another possibility is a solution in which the clock signal transmitted by an external base station over the air directly serves as a reference clock. Here, the time stamp sending unit can synchronise the frequency of its clock over the air with this method.

The above solutions have the advantage that one network element sending the time stamps can serve multiple base stations, since base stations do not have to be located close to the network element.

Figure 3:
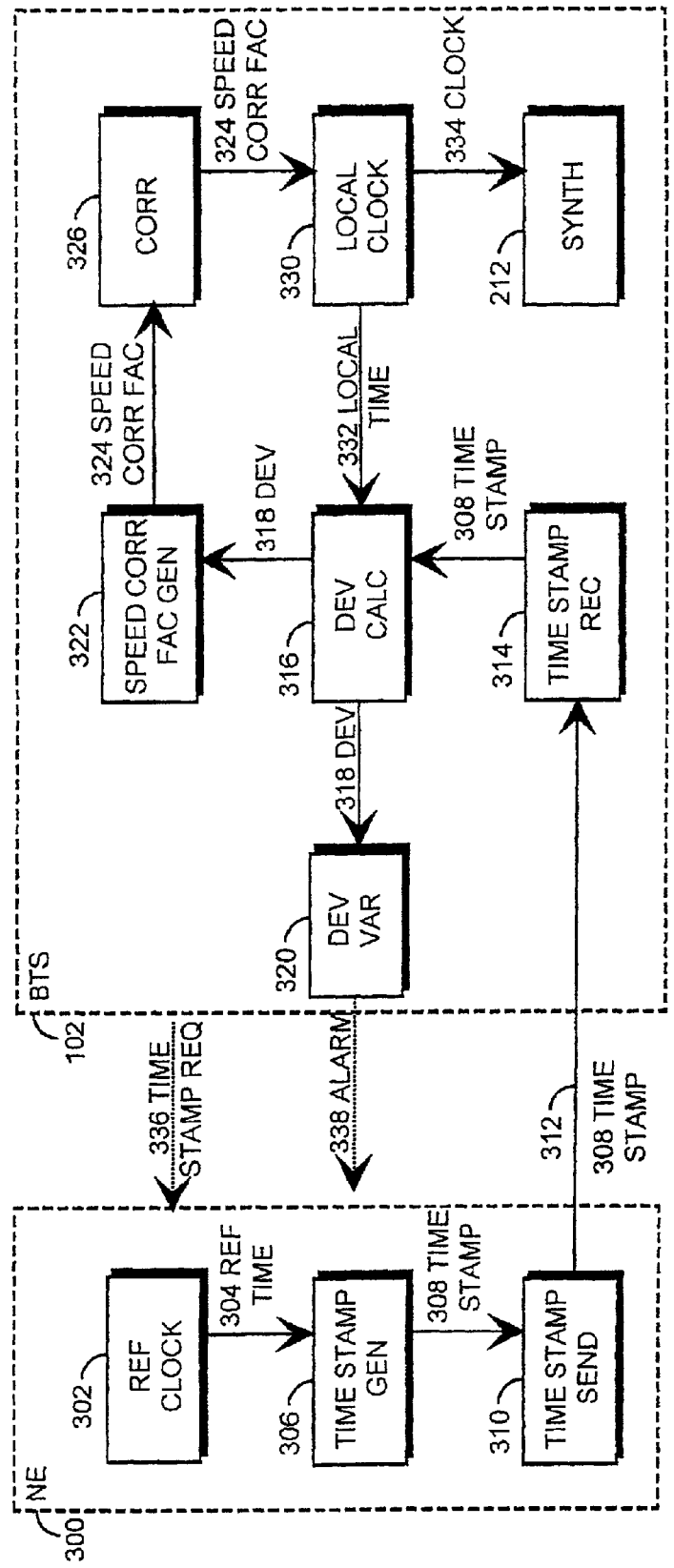
FIG. 3 illustrates an example of a cellular radio network of the invention.

FIG. 3 illustrates an example of the structure of a network part in a cellular radio network of the invention. The rectangle drawn with the dashed line on the right illustrates the structures of the base station 102 that are of interest in the invention. The base station 102 comprises a local clock 330.

The rectangle drawn with the dashed line on the left illustrates a network element 300 connected to the base station 102 via an asynchronous data transmission connection 312. The network element 300 comprises a reference clock 302. The asynchronous data transmission connection 312 is in fact the same as the data transmission connection 160 shown in FIG. 1.

The reference clock 302 comprises means for generating 306 a time stamp signal, and means for sending 310 the time stamp signal 308 over the asynchronous data transmission connection 312 from the network element 300 to the base station 102.

The time stamp receiving unit, i.e. the base station 102, periodically requests 336 time stamps 312 which indicate the difference between two consecutive points in time when a time stamp was generated. The request decision is thus decentralised. Another possibility is that the time stamp sending unit, i.e. the network element 300, sends the time stamps 312 automatically without a specific time stamp request 336.

The base station 102 comprises means for receiving 314 the time stamp signal 308 sent over the asynchronous data transmission connection 312, and means for calculating 316 on the basis of the received time stamp signal 308 how much the time 332 by the local clock at the base station 102 deviates from the time 304 by the reference clock 302.

The time stamp signal 308 is naturally also used for changing the time 332 by the local clock at the base station 102 to correspond to the time by the reference clock 302. This is necessary for the functioning of the method, otherwise it would not be necessary to synchronize the clocks, because in a cellular radio network transmissions of different base stations usually are mutually asynchronous.

The base station 102 further comprises means for generating 322 a speed correction factor 324 for the local clock 330 on the basis of at least one calculated deviation 318; means for correcting 326 the running of the local clock 330 by using the speed correction factor 324; and a frequency synthesizer 212 for generating the frequencies needed at the base station 102 by using the local clock 330 corrected with the speed correction factor 324.

The speed correction factor 324 thus informs how the running of the local clock 330 is to be corrected in the future in order to make it run more precisely. In other words, the time of the local clock 330 is not momentarily changed but the running rate of the clock is continuously controlled. Local clock 130 maintains the required accuracy for at least 50–100 hours. In the local clock 130 a differential voltage control mechanism is used to change the speed of the clock. A speed correction factor 324 is derived from the difference between the actual speed of the local clock 330 and the speed of the reference clock 302 according to the received time stamps 312.

In a preferred embodiment the speed correction factor 324 indicates when the supply voltage of the local clock 330 changes, so the actual correction of the clock speed is performed by a differential control voltage. The application of this differential voltage is accurate to about 80% since the relative change in voltage is very small and the relationship between voltage and clock speed is not perfectly linear. Iteration provides the means to correct the clock with precision; 5–10 iterations should be sufficient. The total time for one iteration procedure should be much shorter than the typical time scale on which the characteristics of the differential voltage control circuit change (which is about one year). The speed correction factor 324 thus compensates for changes that gradually take place in the characteristics of the local clock 330. Therefore the speed correction factor 324 is preferably adjusted more than once a year.

A time stamp can be requested once every 24 hours during a low traffic period (e.g. at night). This is just an example which is used in the calculations below. The value is set in the network element 300 by service personnel according to the specific delay variability characteristics of the intranet.

The time stamps are delayed on the IP network, but for this method the variability of these delays is the relevant quantity. For a target accuracy of $2 \times 10^{-8}$ the delay variability has to be less than two milliseconds.

In a preferred embodiment the base station 102 comprises means 320 for calculating the variation in the transmission delay of a time stamp signal 324 sent over the asynchronous data transmission connection 312, for comparing the deviation to a predetermined limit, and to deduct that the accuracy of the local clock does not meet the required level if the deviation exceeds the predetermined limit. The limit can be for example the above mentioned two milliseconds. If the accuracy of the clock meets the required accuracy, no measures are needed, but if not, then an alarm 338, for example, can be raised at the management system monitoring the cellular radio system.

For the transmission of the time stamps an established protocol such as the network time protocol (NTP) might be used. The time stamp emitting units act as NTP server, and the time stamp receiving units act as NTP clients. NTP measures the transmission delay and corrects the time stamp in an iterative process which can last for a couple of seconds. The protocol does not have to be IP-based as NTP, but could also directly build on top of the Ethernet link layer.

A higher rate of time stamps does not increase the accuracy of this method. But a rate of, for example, one time stamp per hour allows the time stamp receiving units to estimate the delay variability and to validate that the restrictions outlined above are met and to generate an alarm otherwise.

The invention enables to reduce the number of expensive clocks in the office system considerably, since a number of base stations can receive a reference frequency from the same time stamp sending unit. One example of such a scenario is that in one building there is one network element (which can even be a base station) which uses the external network as a reference clock. This reference network element sends time stamps to other base stations deeper inside the building. Within one building, IP delay variability is typically quite low. For wide-spread intranets, the delay variability could become too large. Then, more than one time stamp sending units would be required.

Parts of the network part of the invention are preferably implemented by means of software run in a processor. Parts of the network part of the invention can also be implemented as a hardware solution, for example by applying asic (Application Specific Integrated Circuit) or separate logic.

Figure 4:
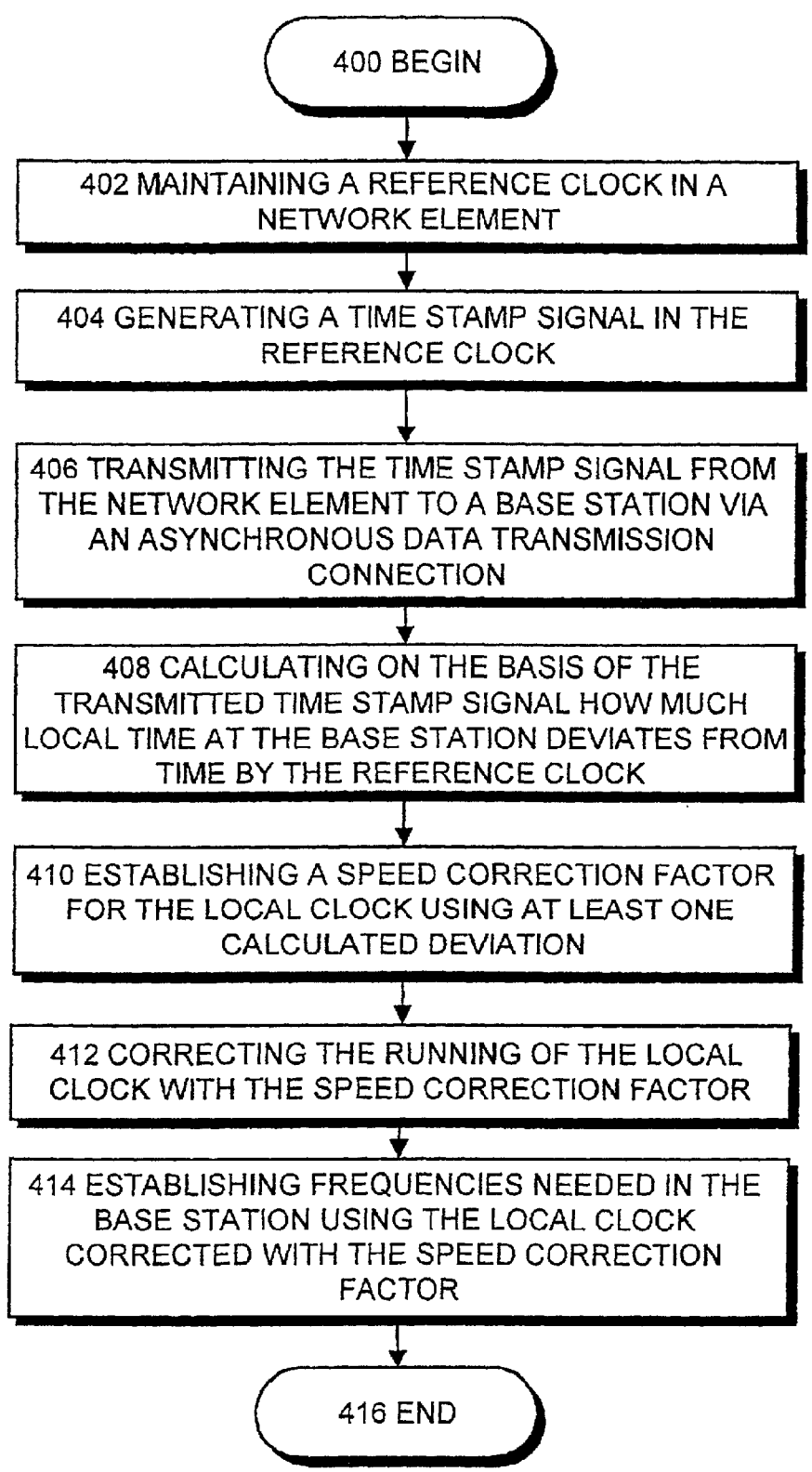
FIG. 4 is a flow chart illustrating measures of a method for performing frequency synchronization of a base station.

The invention can also be described as a method illustrated in FIG. 4. The method starts in block 400. In block 402 is maintained the reference clock of the network part in the cellular radio network. In block 404 is generated a time stamp signal in the reference clock. In block 406 is transferred a time stamp signal over the asynchronous data transmission connection from the network element to the base station. In block 408 is calculated on the basis of the transferred time stamp signal how much the time by the local clock at the base station deviates from the time by the reference clock. In block 410 a speed correction factor is generated for the local clock at least from one calculated deviation. In block 412 the running of the local clock is corrected by applying the speed correction factor. In block 414 the frequencies needed at the base station are generated by using the local clock corrected with the speed correction factor. The method is completed in block 416.

Although the invention is described above with reference to an example according to the accompanying drawings, it is apparent that the invention is not restricted to it, but may vary in many ways within the inventive idea disclosed in the accompanying claims.

We claim:

1. A network part in a cellular radio network comprising:
   a base station, the base station comprising a local clock;
   a network element connected to the base station via an asynchronous data transmission connection, the network element comprising a reference clock;
   the reference clock comprising means for generating a time stamp signal and means for sending the time stamp signal over the asynchronous data transmission connection from the network element to the base station; and
   the base station comprising means for receiving the time stamp signal sent over the asynchronous data transmission connection, means for calculating on the basis of the received time stamp signal how much the time by the local clock at the base station deviates from the time by the reference clock, means for generating a speed correction factor for the local clock on the basis of at least one calculated deviation, means for correcting the running of the local clock with the speed correction factor, and a frequency synthesizer for generating the frequencies needed at the base station by using the local clock corrected with the speed correction factor.

2. A network part according to claim 1, wherein the speed correction factor indicates when the supply voltage of the local clock changes.

3. A network part according to claim 2, wherein the speed correction factor compensates for changes that gradually take place in the characteristics of the local clock.

4. A network part according to claim 3, wherein the speed correction factor is adjusted more than once a year.

5. A network part according to claim 1, wherein the base station further comprises means for calculating the deviation in the transmission delay for the time stamp signal sent over the asynchronous data transmission connection, for comparing the deviation with a predetermined limit, and for concluding that the accuracy of the local clock does not meet the required level if the deviation exceeds the predetermined limit.

6. A method for performing frequency synchronization of a base station in a cellular radio network, the method comprising:
   maintaining a reference clock in a network element of the cellular radio network;
   generating a time stamp signal in the reference clock;
   transferring the time stamp signal from the network element to the base station over an asynchronous data transmission connection;

calculating on the basis of the transferred time stamp signal how much the time by the local clock at the base station deviates from the time by the reference clock;

generating a speed correction factor for the local clock on the basis of at least one calculated deviation;

correcting the running of the local clock with the speed correction factor; and generating the frequencies needed at the base station by using the local clock corrected with the speed correction factor.

7. A method according to claim 6, wherein the speed correction factor indicates when the supply voltage of the local clock at the base station changes.

8. A method according to claim 7, wherein the speed correction factor compensates for changes that gradually take place in the characteristics of the local clock.

9. A method according to claim 8, wherein the correction is performed more than once a year.

10. A method according to claim 6, wherein the deviation in the transmission delay for the time stamp signal sent over the asynchronous data transmission connection is calculated, the deviation is compared with a predetermined limit, and if the deviation exceeds the predetermined limit it is concluded that the accuracy of the local clock at the base station does not meet the required level.

* * * * *